United States Patent
Potapov et al.

(10) Patent No.: US 9,336,275 B2
(45) Date of Patent: May 10, 2016

(54) HASH JOIN USING COLLABORATIVE PARALLEL FILTERING IN INTELLIGENT STORAGE WITH OFFLOADED BLOOM FILTERS

(71) Applicant: Oracle International Corporation, Redwood Shores, CA (US)

(72) Inventors: Dmitry Potapov, Emerald Hills, CA (US); Yiu Woon Lau, Fremont, CA (US); Hakan Jakobsson, San Francisco, CA (US); Umesh Panchaksharaiah, Richmond, CA (US); Poojan Kumar, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/339,412

(22) Filed: Jul. 23, 2014

(65) Prior Publication Data

US 2014/0337314 A1     Nov. 13, 2014

Related U.S. Application Data

(63) Continuation of application No. 12/562,984, filed on Sep. 18, 2009, now Pat. No. 8,825,678.

(60) Provisional application No. 61/192,668, filed on Sep. 19, 2008, provisional application No. 61/099,872, filed on Sep. 24, 2008.

(51) Int. Cl.
  *G06F 17/30*     (2006.01)
  *G06F 3/06*      (2006.01)
  *G06F 12/00*     (2006.01)

(52) U.S. Cl.
  CPC .......... *G06F 17/30498* (2013.01); *G06F 3/067* (2013.01); *G06F 3/0611* (2013.01); *G06F 3/0659* (2013.01); *G06F 12/00* (2013.01); *G06F 17/3033* (2013.01); *G06F 17/30492* (2013.01)

(58) Field of Classification Search
  CPC ..................... G06F 17/30498; G06F 17/30492
  See application file for complete search history.

(56) References Cited

U.S. PATENT DOCUMENTS

| | | | |
|---|---|---|---|
| 4,425,615 A | 1/1984 | Swenson et al. | |
| 5,487,164 A | 1/1996 | Kirchhofer | |

(Continued)

FOREIGN PATENT DOCUMENTS

| | | |
|---|---|---|
| CN | 101150483 | 3/2008 |
| JP | 2002278704 A | 9/2002 |

(Continued)

OTHER PUBLICATIONS

Zhe, L. et al., "PERF join: an alternative to two-way semijoin and Bloomjoin" Proceedings of the 1995 ACM.

(Continued)

*Primary Examiner* — Mariela Reyes
*Assistant Examiner* — Dawaune Conyers
(74) *Attorney, Agent, or Firm* — Hickman Palermo Becker Bingham LLP

(57) ABSTRACT

Processing resources at a storage system for a database server are utilized to perform aspects of a join operation that would conventionally be performed by the database server. When requesting a range of data units from a storage system, the database server includes join metadata describing aspects of the join operation for which the data is being requested. The join metadata may be, for instance, a bloom filter. The storage system reads the requested data from disk as normal. However, prior to sending the requested data back to the storage system, the storage system analyzes the raw data based on the join metadata, removing a certain amount of data that is guaranteed to be irrelevant to the join operation. The storage system then returns filtered data to the database server. The database system thereby avoids the unnecessary transfer of certain data between the storage system and the database server.

24 Claims, 5 Drawing Sheets

(56) References Cited

U.S. PATENT DOCUMENTS

| | | |
|---|---|---|
| 5,551,018 A | 8/1996 | Hansen |
| 5,717,893 A | 2/1998 | Mattson |
| 5,765,034 A | 6/1998 | Recio |
| 5,848,408 A | 12/1998 | Jakobsson et al. |
| 5,987,453 A | 11/1999 | Krishna et al. |
| 5,999,943 A | 12/1999 | Nori et al. |
| 6,044,367 A | 3/2000 | Wolff |
| 6,128,621 A | 10/2000 | Weisz |
| 6,526,483 B1 | 2/2003 | Cho et al. |
| 6,618,729 B1 | 9/2003 | Bhashyam et al. |
| 6,665,684 B2 | 12/2003 | Zait et al. |
| 6,715,006 B1 | 3/2004 | Hotta et al. |
| 6,728,823 B1 | 4/2004 | Walker et al. |
| 6,886,084 B2 | 4/2005 | Kawashima et al. |
| 6,922,754 B2 | 7/2005 | Liu et al. |
| 6,928,451 B2 | 8/2005 | Mogi et al. |
| 6,957,210 B1 | 10/2005 | Ramesh |
| 6,957,222 B1 | 10/2005 | Ramesh |
| 7,047,253 B1 | 5/2006 | Murthy et al. |
| 7,069,324 B1 | 6/2006 | Tiwana et al. |
| 7,092,954 B1 | 8/2006 | Ramesh |
| 7,093,162 B2 | 8/2006 | Barga et al. |
| 7,096,224 B2 | 8/2006 | Murthy et al. |
| 7,136,970 B2 | 11/2006 | Yoshiya et al. |
| 7,159,076 B2 | 1/2007 | Madter |
| 7,165,144 B2 | 1/2007 | Choubal et al. |
| 7,228,354 B2 | 6/2007 | Chambliss et al. |
| 7,231,387 B2 | 6/2007 | Sauermann et al. |
| 7,237,027 B1 | 6/2007 | Raccah et al. |
| 7,290,090 B2 | 10/2007 | Madter |
| 7,454,420 B2 | 11/2008 | Ray et al. |
| 7,461,147 B1 | 12/2008 | Mowat et al. |
| 7,506,103 B2 | 3/2009 | Madter |
| 7,689,623 B1 | 3/2010 | Liu |
| 7,761,425 B1 | 7/2010 | Erickson et al. |
| 7,769,802 B2 | 8/2010 | Smith |
| 7,895,216 B2 | 2/2011 | Longshaw et al. |
| 7,904,562 B2 | 3/2011 | Takase et al. |
| 8,001,134 B2 | 8/2011 | Liu |
| 8,204,892 B2 | 6/2012 | Balebail |
| 8,244,984 B1 | 8/2012 | Glasco et al. |
| 8,370,452 B2 | 2/2013 | Harvell et al. |
| 8,683,139 B2 | 3/2014 | Gaither |
| 2002/0078068 A1 | 6/2002 | Krishnaprasad et al. |
| 2002/0143755 A1 | 10/2002 | Wynblatt et al. |
| 2003/0046396 A1 | 3/2003 | Richter et al. |
| 2003/0115324 A1 | 6/2003 | Blumenau et al. |
| 2003/0172059 A1 | 9/2003 | Andrei |
| 2003/0217071 A1 | 11/2003 | Kobabayshi |
| 2004/0003087 A1 | 1/2004 | Chambliss et al. |
| 2004/0054860 A1 | 3/2004 | Dixit |
| 2004/0062106 A1 | 4/2004 | Ramesh et al. |
| 2004/0064466 A1 | 4/2004 | Manikutty et al. |
| 2004/0117441 A1 | 6/2004 | Liu et al. |
| 2004/0193570 A1 | 9/2004 | Yaeger |
| 2004/0215626 A1* | 10/2004 | Colossi et al. ............... 707/100 |
| 2004/0225845 A1 | 11/2004 | Kruckemyer et al. |
| 2004/0230753 A1 | 11/2004 | Amiri |
| 2004/0254943 A1 | 12/2004 | Malcolm |
| 2005/0050083 A1 | 3/2005 | Jin et al. |
| 2005/0055355 A1 | 3/2005 | Murthy et al. |
| 2005/0086520 A1 | 4/2005 | Dharmapurikar et al. |
| 2005/0120025 A1 | 6/2005 | Rodriguez et al. |
| 2005/0160224 A1 | 7/2005 | Cuomo et al. |
| 2005/0193160 A1 | 9/2005 | Bhatte et al. |
| 2005/0210202 A1 | 9/2005 | Choubal et al. |
| 2005/0283637 A1 | 12/2005 | Coldicott et al. |
| 2006/0047670 A1 | 3/2006 | Yu et al. |
| 2006/0064405 A1 | 3/2006 | Jiang et al. |
| 2006/0101086 A1 | 5/2006 | Ray et al. |
| 2006/0106890 A1 | 5/2006 | Paul et al. |
| 2006/0218123 A1 | 9/2006 | Chowdhuri et al. |
| 2006/0224551 A1 | 10/2006 | Lariba-Pey |
| 2006/0277439 A1 | 12/2006 | Davia et al. |
| 2007/0067575 A1 | 3/2007 | Morris et al. |
| 2007/0124415 A1 | 5/2007 | Lev-Ran et al. |
| 2007/0220348 A1 | 9/2007 | Mendoza et al. |
| 2007/0239680 A1 | 10/2007 | Oztekin et al. |
| 2007/0260819 A1 | 11/2007 | Gao et al. |
| 2007/0271570 A1 | 11/2007 | Brown et al. |
| 2008/0016074 A1 | 1/2008 | Ben-dyke et al. |
| 2008/0016283 A1 | 1/2008 | Madter |
| 2008/0046736 A1 | 2/2008 | Arimilli et al. |
| 2008/0104283 A1 | 5/2008 | Shin et al. |
| 2008/0104329 A1 | 5/2008 | Gaither et al. |
| 2008/0147599 A1 | 6/2008 | Young-Lai |
| 2008/0155229 A1 | 6/2008 | Beyer et al. |
| 2008/0177803 A1 | 7/2008 | Fineberg et al. |
| 2008/0195668 A1 | 8/2008 | Chandrasekar et al. |
| 2008/0208861 A1 | 8/2008 | Ray et al. |
| 2008/0222311 A1 | 9/2008 | Lee et al. |
| 2008/0244209 A1 | 10/2008 | Seeclam et al. |
| 2008/0307266 A1 | 12/2008 | Chandrasekaran |
| 2009/0024384 A1 | 1/2009 | Kobayashi et al. |
| 2009/0034377 A1 | 2/2009 | English et al. |
| 2009/0063591 A1 | 3/2009 | Betten et al. |
| 2009/0119295 A1 | 5/2009 | Chou et al. |
| 2009/0164536 A1 | 6/2009 | Nasre et al. |
| 2009/0248871 A1 | 10/2009 | Takase et al. |
| 2010/0017556 A1 | 1/2010 | Chin et al. |
| 2010/0077107 A1 | 3/2010 | Lee et al. |
| 2010/0082648 A1 | 4/2010 | Potapov et al. |
| 2010/0122026 A1 | 5/2010 | Umamagerswaran et al. |
| 2010/0191717 A1 | 7/2010 | Graefe |
| 2010/0191749 A1 | 7/2010 | Liu |
| 2010/0211577 A1 | 8/2010 | Shimizu et al. |
| 2010/0274962 A1 | 10/2010 | Mosek |
| 2010/0332901 A1 | 12/2010 | Nussbaum et al. |
| 2011/0040861 A1 | 2/2011 | Van der Merwe |
| 2011/0055232 A1 | 3/2011 | Graefe |
| 2011/0066791 A1 | 3/2011 | Goyal et al. |
| 2011/0099179 A1 | 4/2011 | Balebail |
| 2011/0153719 A1 | 6/2011 | Santoro |
| 2011/0302178 A1 | 12/2011 | Liu |
| 2011/0320804 A1 | 12/2011 | Chan et al. |
| 2012/0005184 A1 | 1/2012 | Thilagar et al. |
| 2012/0072776 A1 | 3/2012 | Ng et al. |
| 2012/0144234 A1 | 6/2012 | Clark et al. |
| 2013/0212332 A1 | 8/2013 | Umamageswaran |
| 2013/0232190 A1 | 9/2013 | Miller et al. |
| 2014/0280249 A1 | 9/2014 | Marwah et al. |
| 2015/0006813 A1 | 1/2015 | Goyal et al. |

FOREIGN PATENT DOCUMENTS

| | | | |
|---|---|---|---|
| JP | 2003150419 A | 5/2003 | |
| JP | 2004038758 A | 2/2004 | |

OTHER PUBLICATIONS

Oracle Database Administrator's Guide, 10g Release 2 (10.2), Chapter 24, May 2006, 34 pages, http://download.oracle.com/docs/cd/B19306_01/server.102/b14231.pdf.

O'Neil, P. et al., "Multi-table joins through bitmapped join indices," SIGMOD Record, ACM, New York, NY, US, vol. 24, No. 3, Sep. 1, 1995, pp. 8-11, ISSN 0163-5808.

Michael et al., Improving Distributed Join Efficiency With Extended Bloom Filter Operations, dated 2007, AMC.

Mackert, F. et al., "R* optimizer validation and performance evaluation for local queries" SIGMOD Record, ACM, New York, NY, US, vol. 15, No. 2, Jun. 1, 1986, pp. 85-95, ISSN: 0163-5808.

Loizos, M. et al., "Improving distributed join efficiency with extended bloom filter operations," Advanced Networking and Applications, 2007.

IBM, "A Scheduling Algorithm for Processing Mutually Exclusive Workloads in a multi-systems Configuration," Aug. 19, 2002, IEEE, pp. 1-3.

Graefe et al., "Hash joins and hash teams in Microsoft SQL server," 1998. Proceedings of the 24th VLDB Conference New York, USA, pp. 87-90.

Dharmapurikar, Sarang, et al.,Deep Packet Inspection using Parallel Bloom Filters,<http://www.arl.wustl.edu/~sarang/27_

(56) References Cited

OTHER PUBLICATIONS dharmapurikar_s_updated.pdf>, retrieved on Oct. 28, 2005, 8 pages.
Bloom, Burton H. (1970), "Space/time trade-offs in hash coding with allowable errors", Communications of the ACM 13 (7): 422-426.
W3C, "Xquery 1.0: An XML Query Language (Second Edition)", W3C Recommendation dated Dec. 14, 2010, 165 pages.
Banerjee et al., "Oracle8i-the XML Enabled Data Management System", dated 2000 Proceedings 16th International Conference on Data Engineering, 8 pages.
U.S. Appl. No. 13/839,251, filed Mar. 15, 2013, Supplemental Notice of Allowance, Feb. 29, 2016.
U.S. Appl. No. 13/839,251, filed Mar. 15, 2013, Notice of Allowance, Feb. 4, 2016.

* cited by examiner

HASH JOIN USING COLLABORATIVE PARALLEL FILTERING IN INTELLIGENT STORAGE WITH OFFLOADED BLOOM FILTERS

CROSS-REFERENCE TO RELATED APPLICATIONS; BENEFIT CLAIM

This application is a Continuation of U.S. patent application Ser. No. 12/562,984, filed Sep. 18, 2009; which claims benefit of Provisional Application 61/192,668, filed Sep. 19, 2008, and Provisional Application 61/099,872, filed Sep. 24, 2008, the entire contents of each of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to data manipulation and, more specifically, to storage-side participation in join operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Servers

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to one or more databases, processing requests by clients to access the one or more databases.

A database comprises data and metadata. From a high-level perspective, that data and metadata is maintained in logical structures, for example, according to relational and/or object-relational database constructs. Database metadata defines database objects, such as tables, object tables, views, or complex types. SQL data definition language ("DDL") instructions are issued to a database server to create or configure database objects.

Generally, data is logically structured within a database as one or more data containers. Each container contains records. The data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the present invention are not limited to any particular type of data container or database architecture.

However, for the purpose of explanation, the examples and the terminology used herein shall be typically associated with relational or object-relational databases. Thus, the terms "table," "row," and "column" shall be used herein to refer respectively to a data container, a record, and a field.

Storage Systems

Database servers maintain the underlying data for a database in one or more persistent storage systems. These storage systems typically provide the database servers with large capacities of persistent, non-volatile storage in which the database servers may store the underlying data, often in the form of one or more storage devices such as hard disks. One example of such a storage system is a storage array.

Many storage systems are optimized with software or hardware logic for performing low-level, specialized data management functions, such as storage device backup, storage device optimization, striping across multiple individual storage devices, shared data access, block caching, and so on. Accordingly, database servers often rely on storage systems to provide such low-level functions, so that the database servers can utilize their resources for other tasks, such as query compilation and execution, data analysis, and communication with clients.

In many embodiments, the storage systems utilized by database servers constitute little more than one or more simple, linearly addressed, blocked, and persistent storage devices. As such, the storage systems may be oblivious to the logical structures represented by the underlying data they store. Furthermore, interaction between database servers and storage systems may be limited to simple input/output (I/O) requests to read or write ranges of bytes from or to disk.

Thus, while database servers present database data to clients as logical structures such as described above, the underlying data for a database may be stored in different, simpler structures at the storage system. For example, in order for a database server to store data at a conventional hard disk, the database server structures that data to conform to a block structure supported by the hard disk. So, while most clients issue instructions or queries to a database server that refer to data via reference to logical structures such as tables and columns, the database server actually retrieves that data from a storage system in raw blocks. Through the use of various stored metadata, indexes, and headers, the database server is able to interpret the data within the structures retrieved from the storage system as logical tables, rows, and columns. For convenience, structures in which a database's "raw" or underlying data is stored at a storage system shall hereinafter be referred to as data blocks or data units. Techniques described in terms of data blocks or data units should be understood as being equally applicable to other structures for storing raw data at a storage system.

For example, when a database server executes a command that requires access to a logical structure in a database, the database server may utilize mapping data to identify a data block or range of data blocks at a storage system in which the underlying data for that logical structure is stored. The database server may then send a read request to the storage system for the mapped data block(s). In response to the request, the storage system may read the identified data block(s) from storage and send those data block(s) to the database server. The database server may then interpret the data block(s) as logical rows and columns of a table. The database server executes the command based on its interpretation of the data block(s) as logical rows and columns.

The time required to request and retrieve data blocks from a storage system represents a significant amount of the time required for a database server to execute a database command. Unfortunately, in many operations, some or even all of certain data blocks retrieved from a storage system may not be relevant to the execution of the database command. For example, a client may request data for only a specific column of a table. Because of the underlying data block structure in which the table is stored at the storage system, the database server may be required to request data blocks comprised of data not just for the requested column, but for other columns as well. The database server will then discard the data for the non-requested columns. Thus, the transfer of data for non-requested columns was unnecessary.

As another example, a query may include certain predicate conditions that cause the database server to filter data from the result set. For instance, the query may request all rows whose "color" column value is "red." Unfortunately, without retrieving all of the underlying data for the table, the database server has no way of knowing which rows satisfy such a predicate. There may be, for example, only 1 row in a 100,000 row table that satisfies the predicate. To find the row, the database server must nonetheless retrieve from the storage system every data block for the table, even though most of them will be irrelevant to the query.

Join Operations

Database servers commonly receive commands that require the performance of a class of operations known as "join operations." Generally speaking, a join operation comprises merging each row in a first table with each row in a second table that matches certain join criteria. For each table involved in the join operation, the join operation specifies a subset of one or more columns, known as the join column(s) or join attribute(s). The join criteria may include a comparison of the join columns in the first table with the join columns in a second table. The join criteria may also include one or more conditions. These conditions are often expressed as predicates, and thus the join criteria may be referred to as join predicate(s).

An "equijoin" operation is a common type of join operation, in which a Row A of a first table is merged with a Row B of a second table only if the value(s) of the join column(s) in Row A are equivalent to the value(s) of the join column(s) in Row B. For example, the following SQL statement specifies an equijoin operation in which each row in a table named "employee" is merged with each row in a table named "department," but only when both rows share the same value for their respective "DepartmentID" column.

```
SELECT *
FROM employee
    INNER JOIN department
        ON employee.DepartmentID = department.DepartmentID
```

An "antijoin" is a type of join operation that is similar to an "equijoin," but in which rows are merged only if the values for their respective join columns are not equivalent.

Database servers commonly rely upon an algorithm known as a "hash join" to efficiently perform both "equijoin" and "antijoin" operations. The "hash join" operation, generally speaking, comprises two phases. In the first phase, known as the "build phase," the database server generates a hash table by hashing each row of the first table according to a hash function on the join column(s). In the second phase, known as the "probe phase," the database server then iteratively scans through each row of the second table. For each row in the second table, the database server uses the hash function and the hash table to identify rows in the first table with equivalent join column values. When matching rows are identified, the rows are merged and added to the result set for the join operation, assuming the rows also match any applicable join predicates.

When both tables in the join operation are relatively large, the database server may be unable to fit a hash table for the entire first table into memory. In such situations, the tables may be partitioned and the database server may perform nested loops with respect to the partitions. However, the two phased approach remains essentially the same during each iteration of the loop.

Bloom Filters

A bloom filter is a probabilistic data structure used to identify elements that are not a member of a set. A bloom filter allows for the state of existence of a very large set of possible type values to be represented with a much smaller piece of memory by allowing for a certain degree of error. The nature of the bloom filter is such that application of a bloom filter against an element reveals one of two possibilities: (1) the element is not in the set for which the bloom filter was derived; or (2) the element is a likely candidate to be in the set for which the bloom filter was derived. That is to say, application of the bloom filter may result in false positives, but never in false negatives. Techniques for generating and utilizing a bloom filter are well known and described in, for example, "Space/time trade-offs in hash coding with allowable errors" by Burton H. Bloom, Communications of the ACM, Volume 13, Issue 7, 1970.

An example implementation of a bloom filter follows. The bloom filter is often implemented as an array of bits. Each item in the array is initialized to 0. The array is then populated by applying one or more hash functions to each element in the set, wherein the result of each hash function identifies the index of an array item to set to 1. Once the bloom filter has been constructed for a set, an element is then tested against the bloom filter. The process of testing the element against the bloom filter may comprise, for example, applying the same one or more hash functions to the element and determining if the value of the array at any of the indexes identified by applying the one or more hash functions to the element are still set to 0. If so, the element is determined not to be in the set represented by the bloom filter.

Depending on the data involved, some database servers utilize "bloom filters" for performing join operations. The database server may generate a bloom filter based on the hash table generated for the first table of the join operation. The database server may then utilize the bloom filter to identify one or more rows in the second table for which the value of the join column(s) is hashed to an empty field in the hash table for the first table. Such rows may thus be eliminated from consideration in the join operation without having to actually examine the hash table. Since hash table lookups in many cases are relatively expensive operations, this technique often results in greater efficiency for join operations. Meanwhile, rows that pass the bloom filter are then compared to the actual hash table, so as to specifically identify the matching row(s) of the first table, if any.

Because the number of possible values for any given join column may be large—in many cases virtually infinite—hash tables for join operations can grow to be very large. Bloom filters, which can be of any size, are usually much smaller in size than hash tables. However, in order for the bloom filter to be effective, bloom filters must still be fairly large in size.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
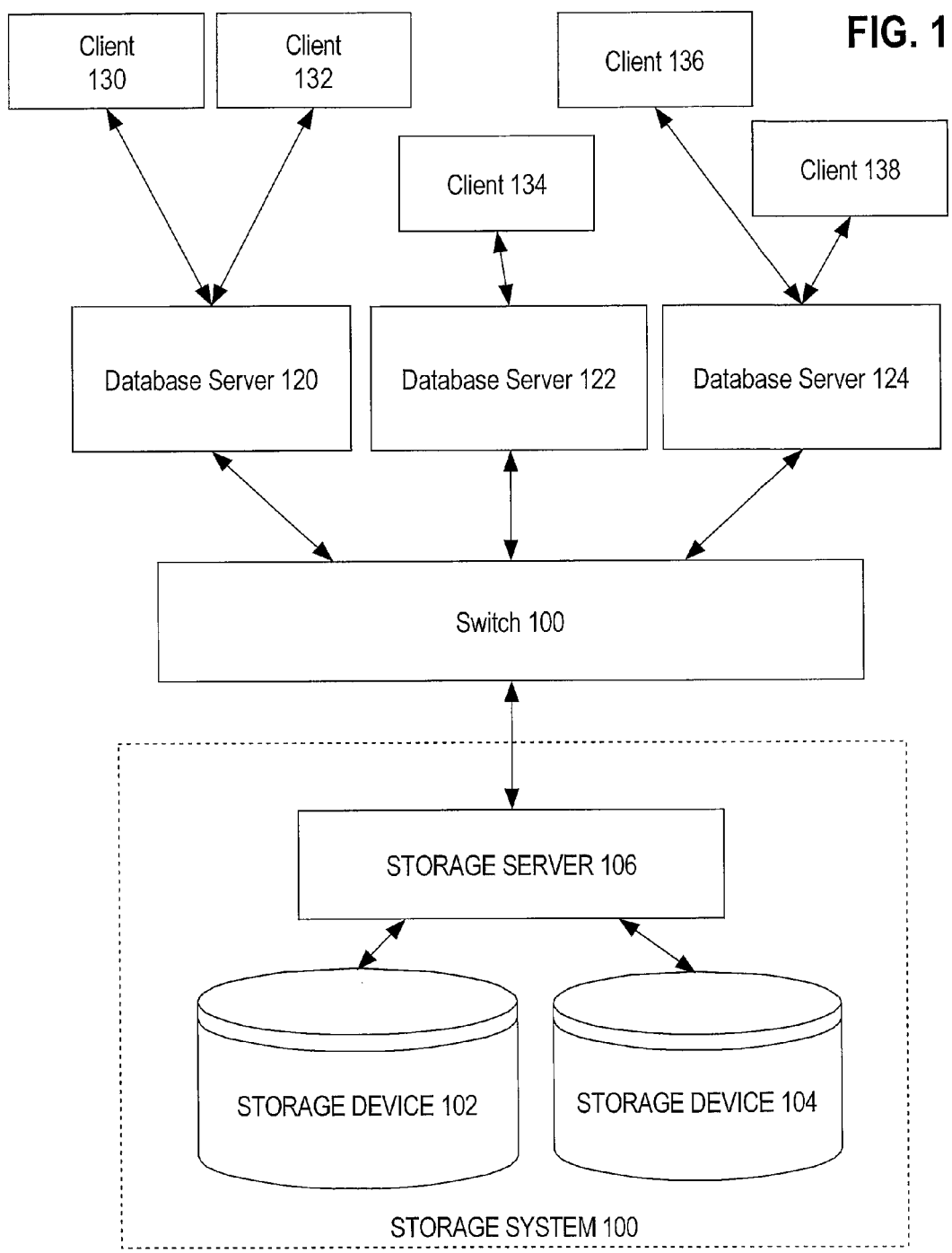
FIG. 1 is a block diagram of a system in which the techniques described herein may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Techniques are described herein for increasing the efficiency of a database system by utilizing processing resources at a storage system to perform various aspects of a join operation, which aspects would conventionally be performed by the database server. According to an embodiment, the database server is configured to, when making a request for a range of data units from a storage system, include with that request join metadata describing various aspects of a join operation for which the data is being requested. The storage system reads the requested data from disk as normal. However, prior to sending the requested data back to the storage system, the storage system filters the requested data based on the join metadata, removing a certain amount of data that is guaranteed to be irrelevant to the join operation. The storage system then returns the filtered data to the database server. Among other benefits of this technique, the database system avoids the unnecessary transfer of a certain amount of data between the storage system and the database server.

According to an embodiment, the join metadata may indicate a hash table generated for the first table in the join operation and/or a bloom filter for such a hash table. According to an embodiment, the database server translates the bloom filter into a predicate prior to communicating it to the storage system. The database server sends this bloom filter predicate along with zero or more other join predicates to the storage system. The storage system is configured to filter the retrieved range of data units based on these join predicates.

According to an embodiment, the storage system is configured with logic for identifying at least some of a logical structure for raw data in the data units stored therein. For example, the storage system may be configured to recognize general data block elements such as headers, data block rows, and data block row fields. However, the storage system is not necessarily aware of the full logical structure of the requested data units, such as the name of a table in which the requested data resides or the name of a column container to which a certain field belongs. The request from the database server may therefore include metadata indicating how the database server translates certain aspects of data blocks into certain logical structures. For example, the database server may include metadata indicating that the third field of each data block row in a requested range of data blocks corresponds to the join column.

Based upon logic for identifying the general data unit structure, metadata indicating how the database server translates certain aspects of the data unit into certain logical structures, and metadata indicating a hash table or a bloom filter, the storage system may identify portions of the data unit that correspond to rows that are irrelevant to the join operation. The storage system removes these irrelevant portions from the requested data prior to returning the requested data back to the database server. In an embodiment, the storage system may translate data units into a logical structure such as a row set, or row source, or table. The translated logical structure is sent to the database server either instead of the data unit, or in a virtual data unit, minus any data corresponding to irrelevant portions.

2.0. Structural Overview

FIG. 1 is a block diagram of a system in which the techniques described herein may be implemented. The system of FIG. 1 and the other example embodiments described below are but some examples of the many different systems in which the techniques described herein may be implemented.

Referring to FIG. 1, a storage system 100 provides storage for data used by several different clients 130, 132, 134, 136 and 138. Those clients make use of storage system 100 indirectly, by sending database commands to database servers 120, 122 and 124. While the system of FIG. 1 depicts only a single storage system, in other embodiments, database servers 120-124 may rely on a plurality of storage systems to provide the data requested by clients 130-138, distributing I/O requests across the storage systems in parallel.

2.1. Example Database Servers and Clients

Database servers 120-124 may be, for example, database servers that respond to the database commands by performing operations for storing, retrieving, and manipulating data stored on databases spread over storage devices 102 and 104 at storage system 100. Clients 130-138 may be, for example, database applications that send database commands to database servers 120-124. Clients 130-138 and database servers 120-124 may be implemented by one or more computing devices. Clients 130-138 may each interact with one or more of database servers 120-124 through any of a variety of means, including communications via network or local interfaces. In the illustrated embodiment, clients 130 and 132 interact with database server 120, clients 134 interacts with database server 122, and clients 136 and 138 interact with database server 124. In actual implementations, the number and type of clients that concurrently interact with a database server will likely vary.

As suggested above, the interactions between clients 130-138 and database servers 120-124 typically involve the communication of data in the form of logical structures such as databases and tables. Clients 130-138 send database commands, such as SQL statements, to database servers 120-124, each command referencing certain of these logical structures. In order to respond to many of these database statements, database servers 120-124 must request from storage system 100 raw data that corresponds to the referenced logical structures, translate that raw data into the referenced logical structures, and perform any operations indicated by the database statements based on the translation. In many cases, database servers 120-124 will return logical structures known as result sets back to clients 130-138 based on the results of performing the operations with respect to the referenced logical structures.

Database servers 120-124 may each interact with storage system 100 through any of a variety of means. For example, as depicted in FIG. 1, each database server 120-124 is connected via a switch 110 to storage system 100. Switch 110 may be, for instance, an Infiniband switch with one or more interfaces for connecting to each of database servers 120-124. Switch 110 may further feature one or more interfaces for connecting to storage system 100. Other embodiments may feature other means for connecting to storage system 100, including connections via any of a wide variety of communication links as well as direct connections between ports at database servers 120-124 and ports at storage system 100 (therefore not requiring a switch 110).

Communications between database servers 120-124 and storage system 100 may take a variety of forms, including simple read/write requests using standard I/O protocols such as Serial ATA or iSCSI. For example, in response to determining that raw data located in a data unit at a certain address is necessary to perform an operation, database server 120 may construct a simple read/write request to storage system 100. In response, storage system 100 may respond with the requested data unit.

According to an embodiment of the invention, database servers 120-124 may also communicate enhanced I/O requests to storage system 100. These requests identify not only the location of data units that store raw data required by database servers 120-124, but also various metadata describing operations that storage system 100 may perform to filter the raw data prior to returning it to database servers 120-124. Such metadata may include, for instance, SQL predicates and metadata describing certain aspects of the logical structure of the raw data in the data units. Database servers 120-124 may, in turn, receive filtered data units from storage system 100 responsive to the enhanced I/O requests. In an embodiment, the filtered data units received by data servers 120-124 may even be reformatted in other structures, such as row-formatted data.

In some embodiments, enhanced requests and responses may be communicated via an enhanced I/O protocol. An example protocol suitable for such communications is Oracle's iDB protocol, which in turn is based on the reliable datagram socket protocol known as the Zero-loss Zero-copy Datagram Protocol (ZDP).

2.2. Example Storage System

Storage system 100 is a system for storing, managing, and providing access to data. In an embodiment, storage system 100 is a self-contained computing device, physically distinct from the one or more computing devices at which database servers 120-124 are implemented. For instance, storage system 100 may be an Exadata cell. However, in other embodiments, physical distinction between storage system 100 and database servers 120-124 is not necessary.

Storage system 100 comprises at least a storage server component 106 and multiple storage devices 102 and 104. Storage devices 102 and 104 are persistent, non-volatile memories upon which is stored raw data organized into data units, such as data blocks, extents, and segments. For example, each storage device 102 and 104 may be a conventional hard disk.

Storage server 106 comprises one or more subcomponents implementing logic for storing, managing, and providing access to the data stored at storage devices 102-104. The subcomponents may be implemented, for example, by hardware and/or one or more software processes executing on one or more processors in storage system 100. Storage server 106 may comprise a variety of subcomponents, including, for instance, a storage controller and/or storage driver for implementing conventional data I/O operations and management tasks with respect to the data stored in devices 102-104.

As another example subcomponent, storage server 106 may comprise one or more interfaces for connecting to database servers 120-124 and/or switch 110. The one or more interfaces facilitate the exchange of requests and responsive raw data or filtered data, as discussed above with respect to database servers 120-124.

Storage server 106 may further comprise a data handling subcomponent coupled to the one or more interfaces. The data handling subcomponent may implement logic for reading raw data from a location in storage device 104 or 106, as identified in a received I/O request. Based on metadata received with the I/O request, the data handling subcomponent may further execute an operation for filtering the raw data prior to returning it via the one or more interfaces. For example, server 106 may have received, with an I/O request, metadata indicating an SQL predicate to apply to the requested raw data. Server 106 may filter out any of the raw data that does not match the predicate.

In some embodiments, execution of various filtering operations may require that the data handling subcomponent interpret the raw data in such a manner as to recognize at least a portion of the logical structure assigned to the raw data by database servers 120-124. For example, the data handling subcomponent may require logic for understanding which bytes of a data unit correspond to data block headers. The data handling unit may further require logic for determining, based on the data block headers, which bytes of the data block correspond to data block rows and/or logical rows. The data handling unit may further require logic for identifying fields in each data block row or logical row. The data handling subcomponent may then utilize its understanding of the identified logical characteristics of the data to filter, for example, data for data block rows whose fields do not meet certain filtering conditions.

In some embodiments, the data handling component may also utilize metadata associated with the I/O request to assist in understanding the logical structure of a data unit. For example, to apply a predicate that filters rows based on the value of their "Address" column, the data handling component must be capable of recognizing which fields of each data unit correspond to the "Address" column. To this end, database servers 120-124 may have sent metadata to storage system 100 indicating which numbered column is labeled "Address."

Logic for recognizing at least a portion of the logical structure assigned to the raw data by database servers 120-124, and for executing filtering operations based upon a logical structure, may be provided by a database library component. According to an embodiment, the database library component comprises instructions for implementing a subset of the logic implemented by database servers 120-124. The database library component may be optimized to include only that logic which is necessary for storage server 106 to perform a special subset of operations normally performed by a database server. The special subset of operations may be, for instance, only those operations that can be performed efficiently at storage server 106.

For example, the database library component may include instructions for interpreting data units as logical structures, for filtering those logical structures based upon predicates, and for aggregating certain types of data, but may lack instructions for performing a sort or other database operations. The subset of operations may vary depending on the embodiment—for example, storage system 100 may comprise resources that are better suited for certain database operations than the resources available to database servers 120-124, and thus the database library component may include instructions for only those operations. As another example, in embodiments where database servers 120-124 distribute I/O requests across multiple storage systems 100 mirroring a same database, any given storage system 100 may only access a portion of the raw data for a table. Thus, while each storage system 100 would be able to efficiently perform operations that involve only a single row of the table, it may be less efficient to use storage system 100 to perform operations that involve accessing every row in the table. Thus, the subset of operations in the database library component of storage server 106 may omit instructions for operations that involve access to multiple rows of the table.

The various components and subcomponents of storage system 100 described above illustrate just one example of a structural architecture for a storage system capable of implementing the techniques described in. In other storage systems, the functionality described herein may be provided by a different set of components and subcomponents. Indeed, the division of work between subcomponents may vary from embodiment to embodiment. Accordingly, any steps described above as being performed by any component or subcomponent of storage system 100, will herein after be attributed to a storage system or storage server in general.

3.0. Functional Overview 3.1. Database Server Work Flow

Figure 2:
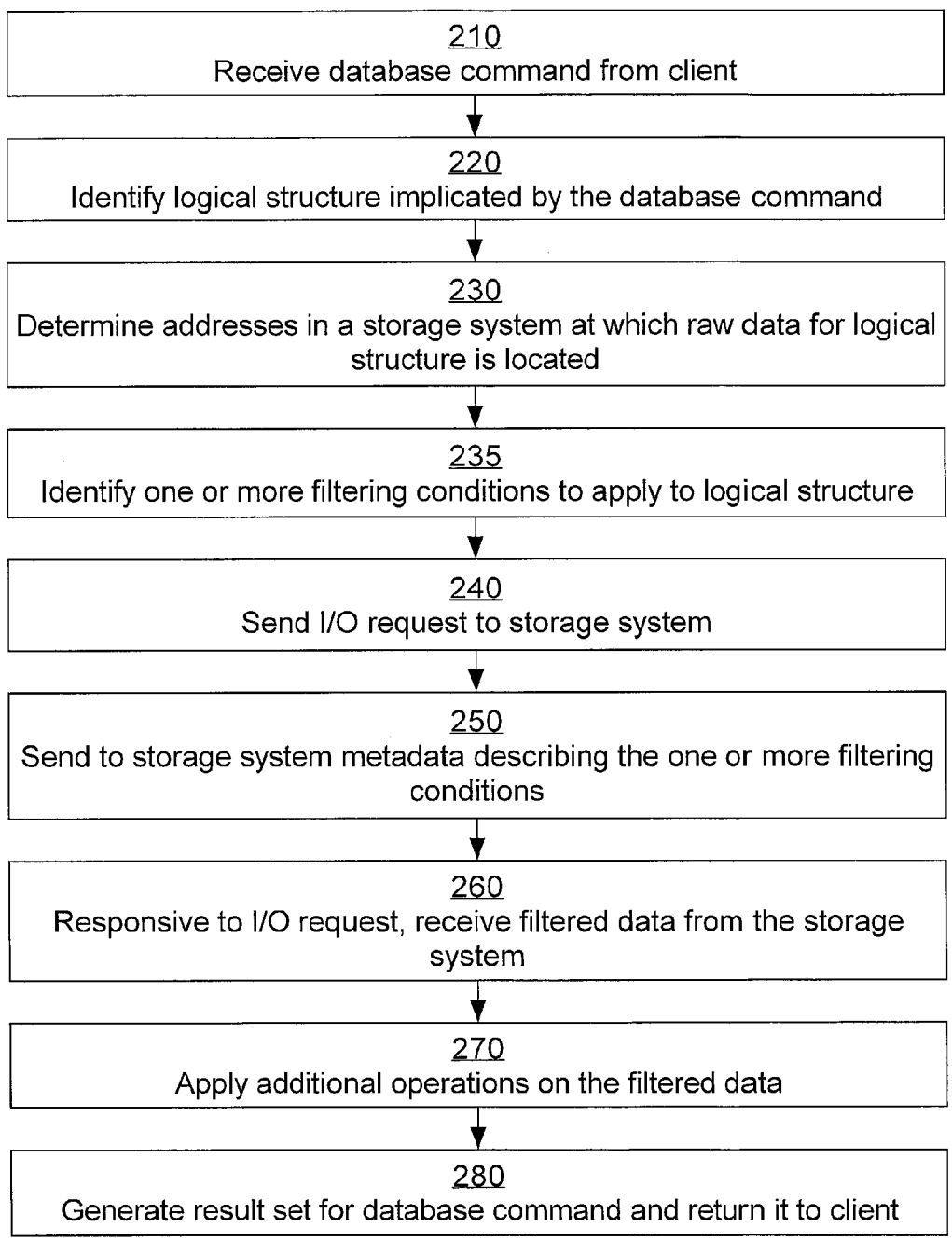
FIG. 2 is a flow chart illustrating a method by which a database server may shift database operations to a storage system.

FIG. 2 is a flow chart 200 illustrating a method by which a database server may shift database operations to a storage system, according to an embodiment of the invention. FIG. 2 is but one example implementation of the techniques described herein. Other embodiments may feature fewer or additional steps, and certain steps may be performed in different orders.

At step 210, a database server receives a database command from the client. For example, database server 120 may receive an SQL statement from client 130.

In response to the database command, at step 220, the database server may identify a logical structure implicated by the database command. For example, database server 120 may determine that execution of the command requires data from a table T1.

In response to identifying an implicated logical structure, at step 230, the database server determines one or more addresses of one or more data units in a storage system at which raw data for the logical structure is located. The determined addresses may be logical or physical, so long as the storage system is capable of identifying physical locations in the storage system that correspond to the addresses. For example, database server 120 may maintain mapping data indicating a logical address of an extent in storage system 100 at which data blocks for table T1 are located. In some embodiments, database server 120 may further translate this logical address into a physical address at a specific one of storage devices 104 or 106.

Further in response to the database command, at step 235, the database server may identify one or more filtering conditions to apply to the logical structure. For example, the database command from client 130 may have included a predicate to be evaluated against each row of table T1 so as to determine only a certain subset of rows from T1 to return to the client. As another example, the database command may have specified a join operation. The database server may generate join metadata describing certain characteristics of the join operation based upon which T1 may be filtered. Example techniques for generating join metadata are discussed in sections 3.3 and 4.3.

At step 240, the database server sends an I/O request to the storage system. The I/O request identifies one or more data units by the one or more addresses determined in step 230. For example, data server 120 may send an iDB protocol request to storage system 100, via switch 110, to read extents corresponding to table T1.

At step 250, the database server sends to the storage system metadata describing the one or more filtering conditions identified in step 235. This metadata may be sent in the request of step 240. This metadata may also be sent before or after the I/O request of step 240. In such cases, the metadata may be stored at a location accessible to the storage system, and subsequently retrieved by the storage system using a lookup identifier included in the I/O request.

At step 260, responsive to the I/O request, the database server receives filtered data from the storage system. For example, because of its interpretation of the I/O request and metadata sent by the database server, the storage system may have executed steps such as: 1) retrieving the one or more data units from the specified address in a persistent storage of the storage system (which step may, in some cases, be performed by retrieving the data units from a cache within the storage system); and 2) applying the one or more filtering conditions to the retrieved one or more data units. In this case, the filtered data received by the database server would be the result of eliminating data from the one or more data units based on the application of the one or more filtering conditions. Example steps by which the filtered data received in step 260 may have been generated are discussed in sections 3.2 and 3.3.

According to an embodiment, the filtered data is in the same form as the original one or more data units (e.g. a data block), but having had certain data removed (e.g. data block rows that failed to match the filtering conditions). In another embodiment, the database server may be configured to recognize filtered data returned in a structure other than the original structure of the one or more data units. For example, the filtered data may be returned via the iDB protocol in a logical structure—such as a row source, row set, or a table—absent certain data that did not match the filtering conditions. In an embodiment, a filtered logical structure may be wrapped inside a "virtual data block." The virtual data block may comprise, for example, structures similar to other data blocks—such as certain headers and/or transmission information—but with a row set as its payload.

At step 270, if necessary, the database server executes additional operations on the filtered data. For example, the database server may execute a database operation on the filtered data that, for whatever reason, the database server determined not to ship to the storage system. As another example, the storage system may have communicated information with the filtered data indicating that the storage system applied certain filtering conditions only in part or not at all, and that the database server should therefore apply those filtering conditions on its own. As another example, the database server may have requested from the storage system data about T1 so that it could join that data with another table T2, for which the database server requested data in a different I/O request. The database server may therefore execute the final steps of the join operation based on the filtered data, with the knowledge that most (if not all) of the irrelevant rows of T1 were removed from the filtered data.

At step 280, based on the filtered data of step 260 and/or step 270, the database server generates a result set for the database command and returns it to the client.

3.2. Storage System Work Flow

Figure 3:
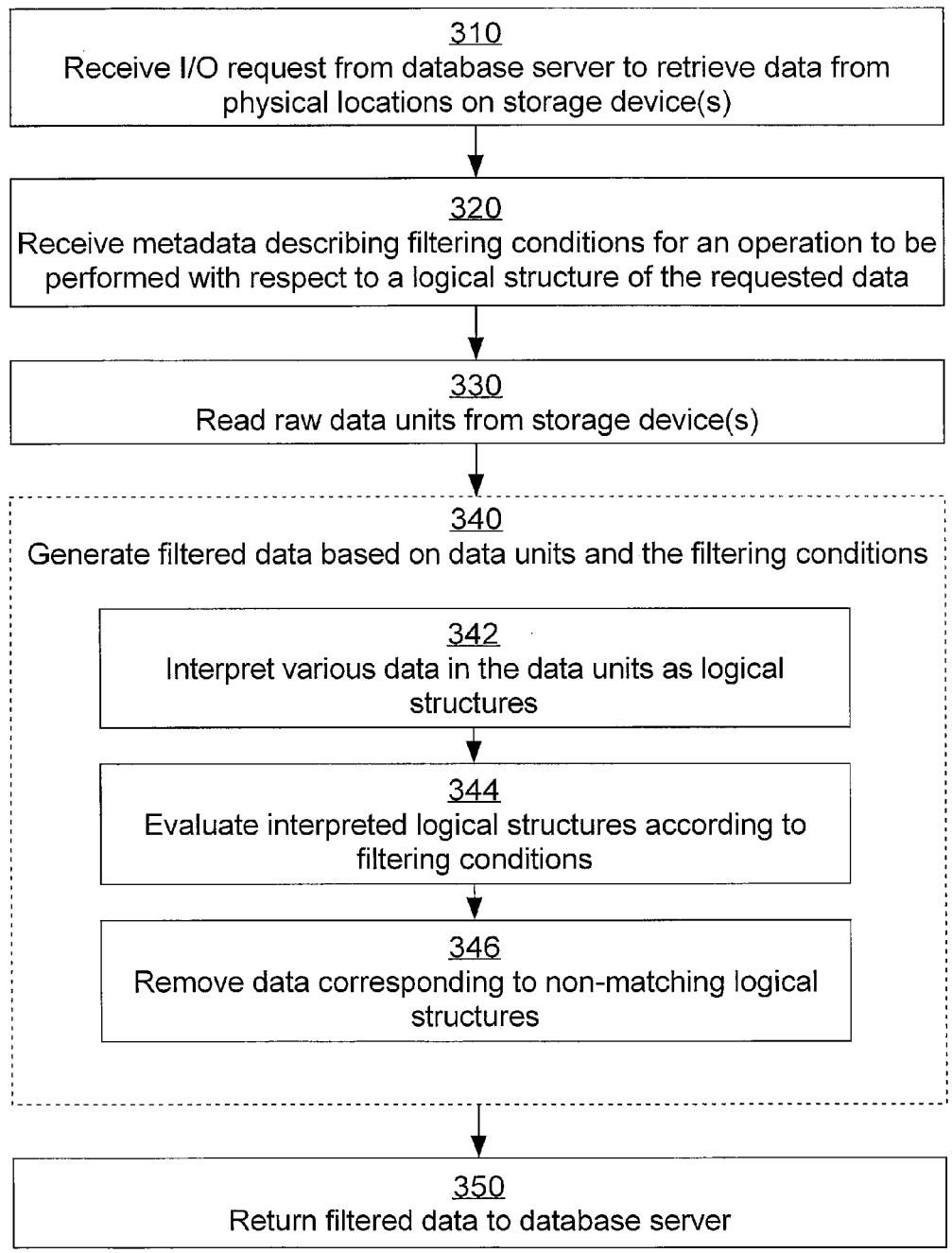
FIG. 3 is a flow chart illustrating a method by which a storage system may pre-filter data requested by a database server.

FIG. 3 is a flow chart 300 illustrating a method by which a storage system may pre-filter data requested by a database server, according to an embodiment of the invention. FIG. 3 is but one example implementation of the techniques described herein. Other embodiments may feature fewer or additional steps, and certain steps may be performed in different orders.

At step 310, a storage server at the storage system receives an I/O request to retrieve data. The request identifies one or more locations of one or more data units in which the requested data is stored at the storage system. For example, the request received by storage server 106 may identify a range of physical addresses on storage device 102 corresponding to a range of data blocks. Such a request may have been sent, for instance, by database server 120 implementing step 240 of FIG. 2. Or, the request may specify logical addresses that the storage server is capable of translating to physical addresses.

At step 320, the storage server receives metadata describing one or more filtering conditions for an operation to be performed with respect to a logical structure of the data requested in step 310. For example, the metadata may include one or more SQL predicates conditioned upon values of a logical column represented by the requested data. As another example, the metadata may describe an aspect of a join operation to be performed with a table represented by the requested data. Such a request may have been sent, for instance, by database server 120 implementing step 250 of FIG. 2. In an embodiment, this metadata may be received in the I/O request of step 310. In some embodiments, this metadata may have been separately received from a database server or another source, and stored at a location accessible to the storage system. In such embodiments, the I/O request may include an identifier by which the storage system may locate the appropriate metadata.

In an embodiment, the metadata may have been serialized or encoded by the database server or in transit from the database server. In such embodiments, step 320 thus further entails reconstituting and/or decoding the received metadata.

At step 330, in response to the I/O request, the storage server reads the one or more data units from the indicated one or more locations. For example, storage server 106 may perform a read operation on storage device 102 to fetch the range of data blocks from the indicated physical address.

At step 340, in response to recognizing that the metadata of step 320 was included in or associated with the I/O request, the storage server generates filtered data based on the one or more data units read in step 330 and the one or more filtering conditions. In an embodiment, the storage server generates this filtered data by removing at least some of the data from a working copy of the one or more data units, which working copy then constitutes the filtered data. In another embodiment, the storage server translates the one or more data units to conform to a logical structure that at least partially reflects how the requesting database server will interpret the one or more data units. The storage server then removes certain data from the logical structure, thereby yielding the filtered data.

In either embodiment, the storage server identifies the data to be removed based on the one or more filtering conditions described in the metadata of step 320. Regardless of how the filtered data is constructed, identifying data to be removed may require, at substep 342 of step 340, that the storage server interpret various data in the data units as logical structures, so as to be able to identify which portions of the one or more data units correspond to logical structures that should be pre-filtered from the one or more data units. For example, storage server 106 may identify certain portions of a data block as corresponding to logical rows, and translate those portions into logical rows accordingly.

To assist in interpreting the one or more data units, a subset of the database server's general logic for translating data units into logical structures may be made available to storage server as, for example, instructions in a database library component. Moreover, the metadata received in step 320 may contain further information regarding how the database server interprets the one or more data units—for instance, table names, column names, field types, field sizes, and so on.

At substep 344 of step 340, the filtering conditions are applied to the logical structures identified in step 342. Those logical structures that do not match the filtering conditions are, in step 346, filtered out of the results for the I/O request.

As an example of steps 342-346, storage server 106 may execute instructions in its database library component to locate header information in a data block read during step 340. Based on this header information, storage server 106 may execute instructions in the database library to locate portions of the data blocks that correspond to table rows. Storage server 106 may translate each of these portions into table rows. One of the filtering conditions communicated to storage server 106 may be the predicate "Year>2000." Storage server 106 thus may utilize metadata sent during step 320 to determine which column of each translated table row corresponds to "Year." Based on this knowledge, storage server 106 identifies which of the translated rows do not have a Year column value greater than 2000 (i.e. which of the translated rows do not match the predicate). All such rows are pre-filtered from the results returned for the I/O request.

At step 350, the storage server replies to the I/O request with the filtered data. The storage server may structure the filtered data in the original structure of the raw data in persistent storage at the storage system, or it may structure the filtered data according to a logical structure such as a row set, rowsource, or table. In various embodiments, the reply may further include information about the filtering operations performed by the storage server, as well as various other metadata.

According to an embodiment, the metadata received in step 320 further indicates a subset of columns that are required by the database server. Thus, in step 340, the storage server may also eliminate any data that does not correspond to those columns.

3.3. Join Filtering Criteria

According to an embodiment, a database server may shift certain tasks required for a join operation to a storage system. For example, the filtering conditions communicated to a storage system in steps 320 and 250 above may include information describing certain aspects of a join operation. In an embodiment, the tasks shifted to the storage system include pre-filtering data for one of the tables involved in the join operation by eliminating any data corresponding to certain rows that are determined not to match any row in the other join table.

Figure 4:
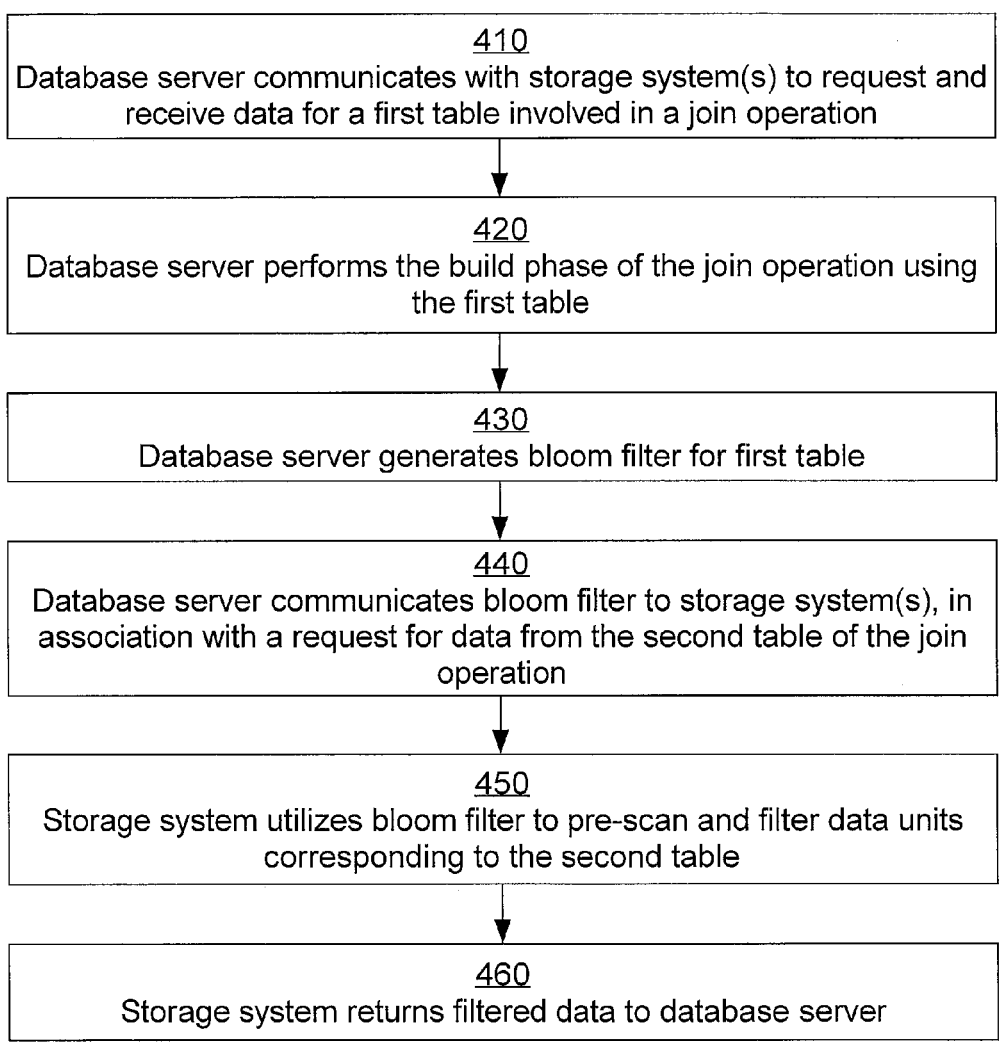
FIG. 4 is a flow chart illustrating a method for a database server to shift certain aspects of a join operation to a storage system.

FIG. 4 is a flow chart 400 illustrating a method for a database server to shift certain aspects of a join operation to a storage system, according to an embodiment of the invention. FIG. 4 is but one example implementation of the techniques described herein. Other embodiments may feature fewer or additional steps, and certain steps may be performed in different orders.

At step 410, in response to initiating execution of a join operation, the database server communicates with one or more storage systems to request and receive data for a first table involved in the join operation. For instance, database server 122 may receive a request to perform an equijoin on tables T1 and T2, with a join column of ID. Database server 122 may thus request data for table T1 from storage system 100.

At step 420, using the data for the first table, the database server performs the build phase of the join operation—that is to say, the database server constructs a hash table for the first table, the hash table being indexed based upon application of a hash function to the first table's join column(s). So, for example, database server 122 may construct a hash table H1 for table T1 by applying a hash function to each row based on the value of the row's ID column.

At step 430, the database server generates a bloom filter based upon the hash table. The step may be performed in accordance with techniques such as discussed in the Background section. For example, database server 122 may generate a bloom filter BF based on the hash table H1.

At step 440, the database server communicates the bloom filter to the one or more storage systems, in association with one or more requests for data from the second table. For example, the bloom filter BF may be sent to the storage server 106 using steps such as described in step 250 or 320. The bloom filter may be sent in association with a request for raw data representing table T2, per steps such as step 240 or 310. According to an embodiment, the database server encapsulates the bloom filter in a "bloom filter predicate" of the form SYS_OP_BLOOM_FILTER(BF, C1, C2, . . . ), where BF is a bit vector representation of the bloom filter and C1, C2, . . . identify join columns. The storage server, in turn, is configured with logic for recognizing this predicate as encapsulating the bloom filter.

At step 450, the storage server utilizes the bloom filter to pre-scan and filter data units corresponding to the second table, using steps such as step 340 of FIG. 3. For example, storage server 106 may read data blocks for table T2 from storage device 102 or 104, per step 330 of FIG. 3. Storage server 106 may then translate the data blocks for table T2 into a set of rows, per step 342 of FIG. 3. Storage server 106 may then evaluate the bloom filter against the join column(s) of each row in the set of rows, per step 344 of FIG. 3. Since any rows that do not hit the bloom filter are guaranteed to not join with table T1, those rows may be eliminated from the set of rows, per step 346 of FIG. 3.

At step 460, the filtered data generated in step 450 is returned to the database server. For example, storage server 106 may return a filtered set of rows to database server 122.

At step 470, the database server performs the remaining steps of the join operation based on the filtered data. For example, since the bloom filter may yield false positives, further filtering is performed at the database server using the hash table prior to the step of identifying rows to merge. As another example, database server 122 may scan through the filtered set of rows to identify matches between the filtered set of rows and the rows of T1. Matching rows may then be merged to form a joined result set. Note that as a result of the join operation, the data in the joined result set comprises logical rows constructed from raw data stored in at least two different data blocks in persistent storage at the storage system.

In some embodiments, data other than a bloom filter may be used to describe aspects of the join operation to the storage system. For example, the database server may simply communicate the entire hash table generated in step 420 to the storage system, as opposed to the bloom filter. As another example, the storage system may identify a set of values that are not in the join column(s) for the first table, and then communicate a number of simple predicates to the storage system based on the identified values. In fact, any data identifying characteristics of the first table may be communicated to the storage system instead of or in addition to a bloom filter, and the storage system may filter based on these characteristics.

In an embodiment, the particular hash functions used for generating the hash table and bloom filters in steps 420 and 430 may be selected based upon the infrastructure of the database system. For example, the sizes of the hash table and bloom filters may be optimized based on known memory or bandwidth constraints. Or, the types of hash functions used may be specially adapted to the infrastructure of the database system.

In an embodiment, the bloom filter (or any other data indicating aspects of the join operation) may be but one of multiple criteria evaluated at the storage system. For example, at step 440, in addition to the bloom filter, the database server may communicate metadata specifying additional predicates that were stated for the join operation. The database server may, for instance, have initiated the join operation in response to a SQL statement such as:

```
SELECT *
FROM employee
    INNER JOIN department
        ON employee.DepartmentID = department.DepartmentID
        WHERE employee.DepartmentID > 1 AND
        employee.status IN ('full-time','leave')
```

Accordingly, in step 440, the database server may send metadata comprising a bloom filter based on the department table, as well as metadata indicating both predicates: "employee.DepartmentID>1" and "employee.status IN ('full-time', 'leave'). The storage system may then filter the retrieved data blocks based on the bloom filter and both predicates.

4.0. Other Implementation Examples 4.1. Determining Whether to Generate/Ship a Bloom Filter According to an embodiment, a database server does not always generate a bloom filter and/or send the bloom filter (or other join conditions) to the storage server. Depending on the sizes of the tables involved, the type of data in the join column(s), and the number of distinct values in the join column(s) it may be more efficient to perform a join operation without generating a hash table and/or bloom filter. For example, generating the hash table or the bloom filter may require an undesirable amount of memory and/or processing time. As another example, unlike most predicates, bloom filter predicates may be especially large. Thus, the transmission of the bloom filter to the storage system may be expensive in terms of I/O bandwidth in comparison to retrieving the raw data unfiltered.

Database servers may already be configured to perform costing functions to estimate, for any given join operation, whether generating a bloom filter is more efficient than probing without the bloom filter. According to an embodiment, these costing functions must be tweaked to consider the effect on performance resulting from shipping the bloom filter to the storage system. In certain situations, a bloom filter that would be inefficient to generate and evaluate at the database server may in fact yield benefits when shipped to a storage system, in that the storage system may be able to significantly reduce bandwidth consumption by pre-filtering data based on the bloom filter. In other situations, the database server may estimate that application of the bloom filter would have more benefit at the database server. Thus the database server would generate the bloom filter but not ship the bloom filter to the storage system.

In an embodiment, a similar process may be used to determine whether to generate a hash table, send the hash table to the storage system, or send any other join criteria to the storage system.

The exact implementation of the cost function may vary from environment to environment. For example, depending on factors such as bandwidth availability, computing power at the database server and storage system, persistent storage speed, and so forth, the perceived benefit of reducing bandwidth consumption in comparison with the perceived cost of resource usage at the storage system and/or the database server will often differ.

4.2. Shipping the Bloom Filter Only Once

According to an embodiment, the database server retrieves the data for the second table of the join operation from one or more storage systems via multiple I/O requests, as opposed to a single I/O request. To avoid sending join criteria with each of the multiple I/O requests, the database server may communicate the join criteria just once. The one or more storage systems may store and re-use the join criteria for each other of the multiple requests. Because certain join criteria such as bloom filters or hash tables may be potentially very large in size, this technique will in many cases greatly reduce bandwidth consumption by the multiple I/O requests.

For example, due to size constraints, the database server may determine to fetch the data for the second table over multiple I/O requests. Prior or to or with the first I/O request, the database server may send a bloom filter for the first table. The database server may associate the bloom filter with a context using an identifier. The storage system may cache the bloom filter and the context identifier. Subsequently, each of the multiple I/O requests may provide the same context identifier. Upon recognizing a context identifier sent with an I/O request, the storage server may locate the cached bloom filter and apply it to any data blocks retrieved based on the I/O request.

As another example, the database server may rely on multiple storage systems mirroring data blocks for a table. The database may request different portions of the raw data from different storage systems in parallel, so as to retrieve the raw data more quickly. Instead of communicating the bloom filter to each of the storage systems, the database server may push the bloom filter to a location accessible to all of the storage systems (such as a shared memory or a designated storage system). As in the previous example, the bloom filter may then be referenced and accessed by the multiple storage systems using a context identifier.

As yet another example, a join operation may be distributed amongst multiple database servers. A context for the join operation may be established for the entire join operation, with a context identifier shared amongst the database servers. Thus, if one database server generates a bloom filter, the bloom filter may be referenced in I/O requests from all of the database servers, without the database servers having to regenerate the bloom filter.

4.3. Shipping Entire Join Operation to Storage Server

According to an embodiment, further aspects of a join operation may also be shipped to multiple storage systems. For example, a storage server may be responsible for all or most of the steps of FIG. 4. To this end, the database server may send further information about the join operation to the storage server, such as the identities of the first table and the join column(s). Using this information, the storage server may perform various aspects of the build phase and/or generate a joined row set. In an embodiment, multiple storage servers may participate in these aspects of the join operation, and information such as the hash table or bloom filter may be shared between the multiple storage systems.

4.4. Dealing with Storage Systems that are Incapable of Participating in Pre-Filtering According to an embodiment, at least one of the storage systems relied upon by a database server may lack components or subcomponents necessary to participate in some or all pre-filtering operations. For example, a database server may rely on both storage system 100 and a traditional storage system. Accordingly, the database server is configured to determine whether a given storage system supports a particular filtering operation prior to sending that operation to the storage system. Such a determination may be accomplished, for example, based on stored configuration information acquired in an initial exchange with the storage system. Based on this determination, the database server may determine both whether to send an enhanced I/O request as well as to whom to send an enhanced I/O request. For example, the database server may be configured to favor a conventional storage array when requesting data for operations that do not stand to gain much from pre-filtering, but favor storage system 100 when requesting data for other operations.

4.5. Joins Between Three of More Tables

Database servers are often asked to perform joins between more than two tables. Such join operations may be implemented internally as a series of "nested" joins. For example, the following SQL statement specifies a join operation for three tables: table1, table2, and table3.

```
SELECT *
FROM table1
    INNER JOIN table2
        ON table1.primarykey = table2.foreignkey
    JOIN table 3
        ON table 2.primarykey = table 3.foreignkey
```

A database server may execute such a join by first joining two of the tables (e.g. table 2 is joined to table 3). The product of this join is then joined with the last table (e.g. the union of table 2 and table 3 is joined with table 1). If the database server relies upon bloom filters, bloom filters will be generated both for the first join operation (e.g. a bloom filter for table 2, to be applied against table 3) and the second join operation (e.g. a bloom filter for table 1, to be applied against the union of table 2 and table 3).

In an embodiment, when processing a join between more than two tables, the database server causes the storage system to pre-filter the raw data for a requested table based not only on a bloom filter for the table with which the requested table is being directly joined, but also on bloom filter(s) for tables with which the product of the immediate join operation will be joined. For example, if table3 is to be probed based on a bloom filter BF2 for table2, and the product of table3 and table2 is to be probed based on a bloom filter BF1 for table1, the database server may ship both BF1 and BF2 to the storage system for application against data blocks of table3.

In an embodiment, the raw data for both of tables in the immediate join operation may be filtered using bloom filter(s) for tables with which the resulting product of immediate join operation will be joined subsequently. Thus, in the above scenario, the database server may ship BF1 to the storage system for application against data blocks of table2 prior to generating the bloom filter for table2.

5.0. Miscellaneous

According to an embodiment, a method comprises: a database server sending to a data storage system: a) a request for data, the request identifying one or more data units stored in the data storage subsystem, wherein the one or more data units are data units in which the data storage system stores data for a first table; and b) metadata describing one or more characteristics of a second table; wherein the request is a communication that, when interpreted by the data storage system, causes the data storage system to retrieve said one or more data units from storage; wherein the metadata is metadata that, when interpreted by the data storage system, causes the data storage system to generate filtered data based upon the retrieved one or more data units and the one or more characteristics of the second table, as described in the metadata; and in response to the request, the database server receiving the filtered data from the data storage system; wherein the method is performed by one or more computing devices.

In an embodiment, the method further comprises: prior to sending the metadata to the data storage system, generating a hash table based upon one or more attributes of the second table; wherein the one or more characteristics comprises said hash table. In an embodiment, the method further comprises: prior to sending the metadata to the data storage system, generating a hash table based upon one or more attributes of the second table; prior to sending the metadata to the data storage system, generating a bloom filter based upon one or more attributes of the second table; wherein at least one of the one or more characteristics is based upon the bloom filter. In an embodiment, the method further comprises: prior to sending the metadata to the data storage system, generating at least one predicate based upon the bloom filter; wherein the one or more characteristics comprises the at least one predicate.

In an embodiment, the one or more data units are raw data units, and identifying the one or more data units comprises identifying one or more locations at which the raw data units are stored. In an embodiment, the filtered data includes one or more raw data units. In an embodiment, the method further comprises: sending to the data storage system metadata indicating at least a portion of a logical structure for the first table. In an embodiment, the method further comprises: the database server performing a first join operation on the first table and the second table based on the filtered data.

In an embodiment, the metadata further describes one or more characteristics of a third table; the metadata is metadata that, when interpreted by the data storage system, causes the data storage system to generate the filtered data based further upon the one or more characteristics of the third table, as described in the metadata; and the method further comprises the database server performing a second join operation on the first table, the second table, and the third table based on the results of the first join operation.

According to an embodiment, a method for performing a join operation comprises: a database server sending to a data storage system: a) a request for data, the request identifying one or more data units stored in the data storage subsystem, wherein the one or more data units are data units in which the data storage system stores data for a first table; and b) one or more join filtering conditions; wherein the request, is a communication that, when interpreted by the data storage system, causes: the data storage system to retrieving said one or more data units from storage; the data storage system generating filtered data by applying the one or more join filtering conditions to the retrieved one or more data units; and in response to the request, the database server receiving the filtered data from the data storage system; performing the join operation based on the filtered data; wherein the method is performed by one or more computing devices.

In an embodiment, the method further comprises: prior to sending the one or more join filtering conditions to the data storage system, generating a hash table based upon one or more attributes of a second table; prior to sending the one or more join filtering conditions to the data storage system, generating a bloom filter based upon one or more attributes of the second table; wherein at least one of the one or more join filtering conditions is based upon the bloom filter. In an embodiment, the method further comprises: prior to sending the one or more join filtering conditions to the data storage system, generating at least one predicate based upon the bloom filter; wherein the one or more join filtering conditions comprises the at least one predicate. In an embodiment, the one or more data units are raw data units, and identifying the one or more data units comprises identifying one or more locations at which the raw data units are stored. In an embodiment, the filtered data includes one or more raw data units. In an embodiment, the method further comprises: sending to the data storage system metadata indicating at least a portion of a logical structure for the first table.

According to an embodiment, method comprises a data storage system performing the steps of: receiving a request to retrieve data, wherein the request identifies one or more locations of one or more data units in which the requested data is stored at the data storage system; receiving metadata describing one or more filtering conditions for a join operation to be performed with respect to the requested data; in response to the request, reading the one or more data units from the one or more locations; based on the one or more join filtering conditions, filtering data from the one or more data units, thereby generating filtered data; responding to the request, wherein the response includes the filtered data; wherein the method is performed by one or more computing devices.

In an embodiment, the one or more filtering conditions include a hash table. In an embodiment, the one or more filtering conditions include a bloom filter. In an embodiment, the one or more filtering conditions include a predicate based upon a bloom filter. In an embodiment, the method further comprises the data storage system performing the steps of: receiving metadata indicating at least a portion of a logical structure for a table whose data is stored in the one or more data units; and based on the at least a portion of the logical structure, identifying one or more attribute values represented by the one or more data units; wherein filtering data from the one or more data units is further based upon applying the one or more filtering conditions to the identified one or more attribute values. In an embodiment, the response further includes at least one of the one or more data units, wherein the at least one of the one or more data units is not filtered.

According to an embodiment, a method comprises a data storage system performing the steps of: receiving a request for data from a database server; wherein the request includes join data indicating an operation to join rows of data stored in data units at the data storage system; in response to the request: reading a plurality of data units from storage; generating response data, wherein generating the response data comprises generating the response data by at least filtering the plurality of data units, based on the join data, to exclude one or more rows that are not to be joined for the indicated operation; and sending the response data to the database server. In an embodiment, generating the response data further comprises generating the response data by at least joining one or more rows from a first data unit with one or more rows from a second data unit, thereby generating one or more joined rows to be returned to the database server in the response data.

6.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
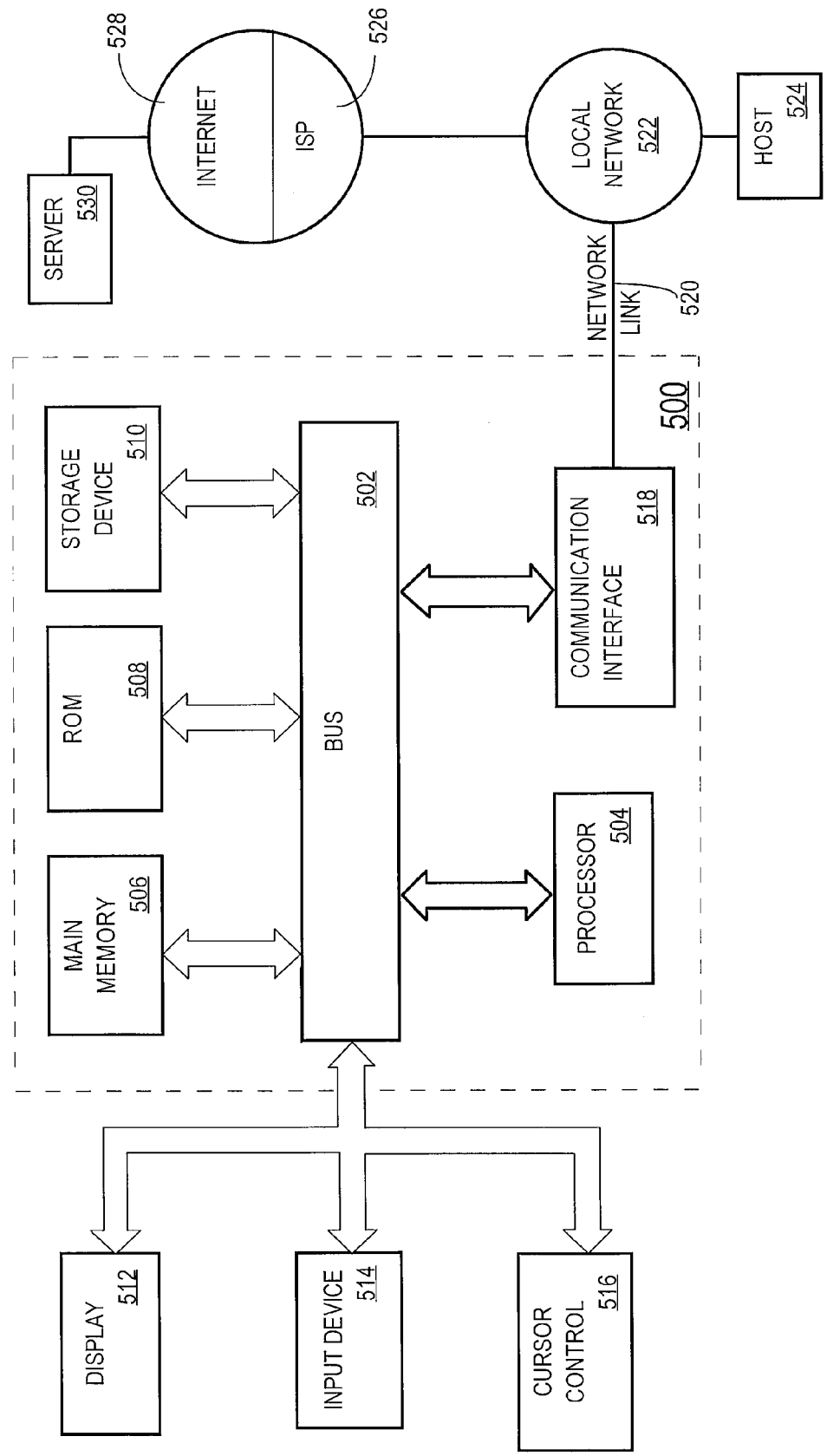
FIG. 5 is a block diagram of a computing device upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
   one or more storage devices storing raw data in data block structures;
   a storage server configured to respond to input/output (I/O) requests directly from one or more database servers, but not to respond to database commands received directly from database clients;
   wherein the I/O requests are requests for raw data from specified data block structures;
   wherein the storage server is configured to respond to the I/O requests from the one or more database servers by reading data blocks from or writing data blocks to the one or more storage devices; and
   a database server, connected via a network to the storage server;
   wherein the storage server acts as an intermediary for all data transfers between the database server and the one or more storage devices;
   wherein the database server is configured to respond to database commands received directly from one or more database clients, but the database server is not capable of directly responding to I/O requests for raw data;
   wherein the database server is configured to perform:
      identifying one or more data blocks, of the data block structures stored on the one or more storage devices, that store raw data that represents a first table;
      generating join metadata based upon one or more attributes of a second table;
      sending to the data storage system:
         a particular I/O request for the one or more data blocks, and
         data indicating the join metadata;
   wherein the storage server is further configured to perform:
      receiving the particular I/O request for the one or more data blocks;
      reading the one or more data blocks from the one or more storage devices;
      identifying a portion of the raw data in the one or more data blocks that represents table rows that are guaranteed, based on the join metadata, to not be needed for a join operation with the second table; and
      returning, to the database server, a filtered version of the one or more data blocks without at least the identified portion;
   wherein the database server is further configured to perform:
      receiving the filtered version of the one or more data blocks from the storage server; and
      a join operation between the first table and the second table based on the filtered version of the one or more data blocks.

2. The system of claim 1, wherein the storage server is further configured to perform:
   generating a virtual data block comprising data block header or transmission information and a payload;
   wherein the payload encapsulates a row set;
   wherein the row set is comprised of table rows;
   wherein the table rows correspond to raw data in the one or more data blocks;
   wherein the virtual data block is the filtered version of the one or more data blocks.

3. The system of claim 1, further comprising:
   a plurality of database servers, including the database server, configured to perform different sub-operations of the join operation;
   a plurality of storage servers, including the storage server, configured to access different data block structures on different storage devices of the one or more storage devices;
   wherein the particular I/O request is one of multiple I/O requests to the storage servers for data blocks upon which raw data representing the first table is stored;
   wherein at least some of the database servers are configured to send, with the multiple I/O requests, data indicating the join data by referencing a shared location at which the join data is stored.

4. The system of claim 1, wherein the database server is further configured to determine whether to send the data indicating the join metadata to the data storage system based on a costing function that at least considers a performance effect of applying the join metadata at the data storage system.

5. The system of claim 1,
   wherein the database server is further configured to send, to the storage server, metadata indicating to the data storage system one or more data block row fields, of the one or more data blocks, that correspond to one or more particular columns of the first table;
   wherein the storage server is further configured to identify the portion of the raw data in the one or more data blocks by comparing values of the one or more data block row fields, or results of one or more functions of the values, to the join metadata.

6. The system of claim 1, wherein the join metadata is a hash table.

7. The system of claim 1, wherein the join metadata is a bloom filter.

8. A method comprising:
   identifying, at a database server, one or more data blocks in which a data storage system stores raw data that represents a first table;
   wherein the database server is configured to respond to database commands from one or more database clients, but the database server is not capable of directly responding to input/output (I/O) requests that are requests for raw data;
wherein the data storage system comprises a storage server that is configured to respond to I/O requests directly from one or more database servers, but not to respond to database commands received directly from database clients;
wherein the storage server acts as an intermediary for all data transfers between the database server and one or more storage devices of the data storage system;
generating join metadata based upon one or more attributes of a second table;
the database server sending to the data storage system:
an input/output (I/O) request for the one or more data blocks; and
data indicating the join metadata;
wherein the I/O request is a communication that, when interpreted by the data storage system, causes:
the data storage system reading the one or more data blocks from the one or more storage devices;
identifying a portion of the raw data in the one or more data blocks that represents table rows that are guaranteed, based on the join metadata, to not be needed for a join operation with the second table; and
returning a filtered version of the one or more data blocks without at least the identified portion;
in response to the I/O request, the database server receiving the filtered version of the one or more data blocks from the data storage system;
the database server performing a join operation between the first table and the second table based on the filtered version of the one or more data blocks;
wherein the method is performed by one or more computing devices.

9. The method of claim 8, wherein the filtered version of the one or more data blocks comprises one or more of: one or more raw data blocks, one or more filtered data blocks, a row source, a row set, or a table.

10. The method of claim 8, wherein the filtered response comprises a virtual data block, comprising at least: a payload comprised of a row set, and data block header or transmission information.

11. The method of claim 8, further comprising:
sending multiple I/O requests to one or more data storage systems, including the data storage system, for different sets of one or more data blocks in which the data storage system stores data for the first table, the multiple I/O requests including the I/O request;
wherein at least some of the multiple I/O requests include data that indicate the join metadata using data by which the one or more data storage systems locate a cached copy of the join metadata stored in a shared location accessible to each of the one or more data storage systems.

12. The method of claim 8, further comprising determining whether to send the data indicating the join metadata to the data storage system based on a costing function that at least considers a performance effect of applying the join metadata at the data storage system.

13. The method of claim 8, further comprising:
sending to the data storage system metadata indicating to the data storage system one or more data block row fields, of the one or more data blocks, that correspond to one or more particular columns of the first table, wherein identifying the portion of the raw data in the one or more data blocks comprises comparing values of the one or more data block row fields, or results of one or more functions of the values, to the join metadata.

14. The method of claim 8, wherein the database server is one of a plurality of database servers involved in performing the join operation, the method further comprising:
storing the join metadata; and
other database servers in the plurality of database servers sending I/O requests to one or more data storage systems, including the data storage system, that reference the stored join metadata, instead of the other database servers regenerating the join metadata.

15. The method of claim 8, wherein the join metadata is a hash table.

16. The method of claim 8, wherein the join metadata is a bloom filter.

17. One or more non-transitory computer-readable storage media storing instructions that, when executed by one or more computing devices, cause:
identifying, at a database server, one or more data blocks in which a data storage system stores raw data that represents a first table;
wherein the database server is configured to respond to database commands from one or more database clients, but the database server is not capable of directly responding to input/output (I/O) requests that are requests for raw data;
wherein the data storage system comprises a storage server that is configured to respond to I/O requests directly from one or more database servers, but not to respond to database commands received directly from database clients;
wherein the storage server acts as an intermediary for all data transfers between the database server and one or more storage devices of the data storage system;
generating join metadata based upon one or more attributes of a second table;
the database server sending to the data storage system:
an input/output (I/O) request for the one or more data blocks; and
data indicating the join metadata;
wherein the I/O request is a communication that, when interpreted by the data storage system, causes:
the data storage system reading the one or more data blocks from the one or more storage devices;
identifying a portion of the raw data in the one or more data blocks that represents table rows that are guaranteed, based on the join metadata, to not be needed for a join operation with the second table; and
returning a filtered version of the one or more data blocks without at least the identified portion;
in response to the I/O request, the database server receiving the filtered version of the one or more data blocks from the data storage system;
the database server performing a join operation between the first table and the second table based on the filtered version of the one or more data blocks.

18. The one or more non-transitory computer-readable storage media of claim 17, wherein the filtered response comprises a virtual data block, comprising at least: a payload comprised of a row set, and data block header or transmission information.

19. The one or more non-transitory computer-readable storage media of claim 17, wherein the instructions, when executed by the one or more computing devices, further cause:
sending multiple I/O requests to one or more data storage systems, including the data storage system, for different sets of one or more data blocks in which the data storage system stores data for the first table, the multiple I/O requests including the I/O request;

wherein at least some of the multiple I/O requests include data that indicate the join metadata using data by which the one or more data storage systems locate a cached copy of the join metadata stored in a shared location accessible to each of the one or more data storage systems.

20. The one or more non-transitory computer-readable storage media of claim 17, wherein the instructions, when executed by the one or more computing devices, further cause determining whether to send the data indicating the join metadata to the data storage system based on a costing function that at least considers a performance effect of applying the join metadata at the data storage system.

21. The one or more non-transitory computer-readable storage media of claim 17, wherein the instructions, when executed by the one or more computing devices, further cause:

sending to the data storage system metadata indicating to the data storage system one or more data block row fields, of the one or more data blocks, that correspond to one or more particular columns of the first table, wherein identifying the portion of the raw data in the one or more data blocks comprises comparing values of the one or more data block row fields, or results of one or more functions of the values, to the join metadata.

22. The one or more non-transitory computer-readable storage media of claim 17, wherein the database server is one of a plurality of database servers involved in performing the join operation, wherein the instructions, when executed by the one or more computing devices, further cause:

storing the join metadata; and other database servers in the plurality of database servers sending I/O requests to one or more data storage systems, including the data storage system, that reference the stored join metadata, instead of the other database servers regenerating the join metadata.

23. The one or more non-transitory computer-readable storage media of claim 17, wherein the join metadata is a hash table.

24. The one or more non-transitory computer-readable storage media of claim 17, wherein the join metadata is a bloom filter.

* * * * *